United States Patent
Chao

(10) Patent No.: US 10,200,850 B2
(45) Date of Patent: Feb. 5, 2019

(54) METHOD OF DISTRIBUTING GROUP MESSAGE OF MACHINE TYPE COMMUNICATION

(71) Applicant: Alcatel Lucent, Boulogne Billancourt (FR)

(72) Inventor: Hua Chao, Shanghai (CN)

(73) Assignee: ALCATEL LUCENT, Boulogne Billancourt (FR)

( * ) Notice: Subject to any disclaimer, the term of this patent is extended or adjusted under 35 U.S.C. 154(b) by 0 days.

(21) Appl. No.: 14/431,798

(22) PCT Filed: Sep. 4, 2013

(86) PCT No.: PCT/IB2013/002100
§ 371 (c)(1),
(2) Date: Mar. 27, 2015

(87) PCT Pub. No.: WO2014/049418
PCT Pub. Date: Apr. 3, 2014

(65) Prior Publication Data
US 2015/0245162 A1    Aug. 27, 2015

(30) Foreign Application Priority Data

Sep. 29, 2012  (CN) .......................... 2012 1 0378852

(51) Int. Cl.
*H04W 8/02*     (2009.01)
*H04W 76/40*    (2018.01)
(Continued)

(52) U.S. Cl.
CPC ............ *H04W 8/02* (2013.01); *H04L 12/189* (2013.01); *H04W 4/021* (2013.01); *H04W 4/08* (2013.01);
(Continued)

(58) Field of Classification Search
CPC ... H04L 12/189; H04L 5/0094; H04L 51/046; H04W 4/005; H04W 4/08; H04W 8/02;
(Continued)

(56) References Cited

U.S. PATENT DOCUMENTS 6,912,402 B1 * 6/2005 Haumont ............. H04L 1/1883
                                                            455/517
8,867,476 B2 * 10/2014 Jain ...................... H04B 15/00
                                                            370/254
(Continued)

FOREIGN PATENT DOCUMENTS

CN        102 238 477 A    11/2011
CN        102244855 A      11/2011
(Continued)

OTHER PUBLICATIONS

InterDigital Communications, "Triggering a detached MTC device," 3rd Generation Partnership Project (3GPP), 3GPP TSG SA WG2 Meeting #83, TD S2-110673, pp. 1-4, XP050523859, Salt Lake City, Utah, USA, Feb. 21-25, 2011.
(Continued)

*Primary Examiner* — Ivan O Latorre
(74) *Attorney, Agent, or Firm* — Fay Sharpe LLP

(57) ABSTRACT

The invention relates to a method, in an interworking function device, of distributing a group message of machine type communication, the method including the steps of: receiving the group message from a service capability server, wherein the group message includes location/area information, radio access technology information, external group identifier information and/or application layer data; selecting a transmission mode under a predetermined policy according to the group message or obtaining the transmission mode by querying a home location register or a home subscriber server according to the group message; translating the location/area information into a geographical area in
(Continued)

which the group message is transmitted and updating the group message with the geographical area; mapping the external group identifier information to internal group identifier information according to information in the home location register or the home subscriber server and updating the group message with the internal group identifier information to obtain an updated group message; querying the home location register or the home subscriber server according to the updated group message about a core network node or a broadcast system node for transmitting the group message; and transmitting the updated group message to the core network node or the broadcast system node in the selected transmission mode.

14 Claims, 4 Drawing Sheets

(51) Int. Cl.
*H04L 12/18* (2006.01)
*H04W 4/08* (2009.01)
*H04W 4/14* (2009.01)
*H04W 4/021* (2018.01)
*H04W 4/70* (2018.01)

(52) U.S. Cl.
CPC .............. *H04W 4/14* (2013.01); *H04W 4/70* (2018.02); *H04W 76/40* (2018.02)

(58) Field of Classification Search
CPC ..... H04W 76/002; H04W 4/021; H04W 4/14; H04W 72/042; H04W 72/12; H04W 28/06; H04W 68/005; H04W 76/40; H04W 4/70
USPC .............. 370/310, 312, 328, 329, 254, 389; 455/518, 458, 466, 456.3, 517
See application file for complete search history.

(56) References Cited

U.S. PATENT DOCUMENTS

| | | | | |
|---|---|---|---|---|
| 2004/0180675 | A1* | 9/2004 | Choi | H04L 12/1877 455/458 |
| 2008/0084878 | A1* | 4/2008 | Akbar | H04L 12/1886 370/390 |
| 2011/0201365 | A1* | 8/2011 | Segura | H04W 4/70 455/466 |
| 2011/0211439 | A1* | 9/2011 | Manpuria | H04W 76/18 370/216 |
| 2011/0274040 | A1 | 11/2011 | Pani et al. | |
| 2012/0033605 | A1* | 2/2012 | Yang | H04W 72/005 370/312 |
| 2012/0033613 | A1 | 2/2012 | Lin et al. | |
| 2012/0066330 | A1* | 3/2012 | Fan | H04L 12/1859 709/206 |
| 2012/0147887 | A1* | 6/2012 | Fan | H04L 12/1859 370/390 |
| 2012/0163271 | A1 | 6/2012 | Kwon et al. | |
| 2012/0170502 | A1* | 7/2012 | Korus | H04W 4/06 370/312 |
| 2012/0207094 | A1* | 8/2012 | Liao | H04W 4/005 370/328 |
| 2013/0053087 | A1 | 2/2013 | Li et al. | |
| 2013/0080597 | A1* | 3/2013 | Liao | H04L 5/0001 709/219 |
| 2013/0115993 | A1* | 5/2013 | Jain | H04W 4/005 455/517 |
| 2013/0196704 | A1* | 8/2013 | Jain | H04L 5/1469 455/518 |
| 2015/0119083 | A1* | 4/2015 | Chandramouli | H04W 60/04 455/456.3 |
| 2015/0230063 | A1* | 8/2015 | Chandramouli | H04W 4/005 455/466 |

FOREIGN PATENT DOCUMENTS

| | | | |
|---|---|---|---|
| JP | 2012-170084 A | 9/2012 | |
| KR | 10-2011-0030229 A | 3/2011 | |
| TW | 201212693 A1 | 3/2012 | |
| TW | 201249152 A1 | 12/2012 | |
| WO | WO2011/134394 | * 11/2011 | .............. H04W 8/08 |
| WO | WO2012/019522 | * 2/2012 | ............ H04W 28/02 |

OTHER PUBLICATIONS

"3$^{rd}$ Generation Partnership Project; Technical Specifications Group Services and System Aspects; System Improvements for Machine-Type Communications; (Release 10)," 3GPP TR 23.888, V0.3.2, pp. 1-33, XP 050401986, (Mar. 2010).
International Search Report for PCT/IB2013/002100 dated Jan. 29, 2014.
3GPP TS 23.041 V10.3.0 (Mar. 2012), Technical Specification, "3rd Generation Partnership Project; Technical Specification Group Core Network and Terminals; Technical realization of Cell Broadcast Service (CBS)," (Release 10), 32 pages.
KPN, "Group based addressing solution from 23.888", SA WG2 Meeting #92, Jul. 9-13, 2012, Barcelona, Spain, S2-122753, (revision of S2-12xxxx), Document for: Approval, Agenda Item: 8.2, Work Item / Release: GROUP Rel-12, 5 pages.
Sierra Wireless, et al., "Triggering procedure over Tsp", 3GPP TSG SA WG2 Meeting #89, Feb. 6-10, 2012, Vancouver, Canada, TD S2-121020, (revision of 0558->0945->0995), Document for: Approval, Agenda Item: 9.7.4, Work Item / Release: SIMTC / Rel-11, 4 pages.
ZTE, "MTC Group ID considerations", 3GPP SA WG2 Meeting #92, Jul. 9-13, 2012—Barcelona, Spain, S2-122850, Document for: Discussion / Approval, Agenda Item: 8.2.4, Work Item / Release: MTCe-GROUP / Rel-12, 4 pages.
Alcatel-Lucent Shanghai Bell, Alcatel-Lucent, "Distribution of MTC Group Messages", 3GPP SA WG2 Meeting #93, Oct. 8-12, 2012—Sofia, Bulgaria, S2-123708, Document for: Approval, Agenda Item: 8.2.4, Work Item / Release: MTCe-GROUP / Rel-12, 4 pages.

* cited by examiner

METHOD OF DISTRIBUTING GROUP MESSAGE OF MACHINE TYPE COMMUNICATION

FIELD OF THE INVENTION

The present disclosure relates to the field of communications, and more particularly to a method of and an apparatus for distributing a group message of machine type communication.

BACKGROUND OF THE INVENTION

Machine Type Communication (MTC) was introduced by the international standardization organization 3GPP initially in the release REL. 10. The working team SA2 of the 3GPP has recently approved a new Work Item (WI) on MTC of the release REL. 12, i.e., machine-type and other mobile data application communication enhancements. The invention is focused on a part of this new work item, i.e., group feature based machine type communication. A machine type communication group will be referred below as an MTC group for the sake of conciseness.

Group based messaging is defined in the prior art as follows: group based messaging can be used to distribute efficiently the same message (e.g., a trigger request) to the members in an MTC group, all of which are located in a particular geographical area upon the request of the SCS (Service Capability Server). The geographical area for distribution is a concept used in 3GPP system and can be a cell sector, a cell, a group of cells or a Public Land Mobile Network (PLMN).

As further noted in the prior art, a group message is initiated by a trusted SCS. The following information has to be included over an interface via which the SCS transmits the group message:

1) Application layer data of the group message; and
2) A group identifier corresponding to the group message.

Optionally, there is a location/area and a Radio Access Technology in which the group message has to be distributed.

Although a Cell Broadcast Service (CBS) can offer a fundamental capability to transmit a group based trigger message (noted the trigger message is one of the important group messages), some details for group message distribution have not been taken into account. For example, where and how to map an external group identifier and an internal group identifier, which CBS entities should be used to transmit a group message, etc. Moreover, there are also some drawbacks for CBS itself to act as an alternative to transmit a group based trigger message, particularly as follows:

1) In some typical MTC applications, both the capability and the behavior of an MTC device is simpler than a normal UE, and at this time CBS is inefficient;
2) Moreover, since CBS is more suitable for the transmission of a text service, CBS may not be competent when an MTC server may distribute a larger amount of data to its MTC devices; and
3) Since CBS has not been very popular for bearing services, that is, it has not been deployed widely, a group based trigger message which is a killer service of MTC may cause CBS to become deployed widely and then bring a deployment stress to operators.

As can be apparent from the analysis above, the CBS can not be competent for all the application scenarios where a group message is distributed, so it may not be practicable to perform a task of distributing a group message simply through CBS; and moreover there are several types of group messages, and a unified solution may not be practicable, either.

SUMMARY OF THE INVENTION

In view of the prior art and the technical problems thereof above, it will be very beneficial to provide an efficient method applicable to distribution of various different types of group message of machine type communication.

A first aspect of the invention proposes a method, in an interworking function device, of distributing a group message of machine type communication, the method including the steps of:

a. receiving the group message from a service capability server, wherein the group message includes location/area information, radio access technology information, external group identifier information and/or application layer data;

b. selecting a transmission mode under a predetermined policy according to the group message or obtaining the transmission mode by querying a home location register or a home subscriber server according to the group message;

c. translating the location/area information into a geographical area in which the group message is transmitted and updating the group message with the geographical area;

d. mapping the external group identifier information to internal group identifier information according to information in the home location register or the home subscriber server and updating the group message with the internal group identifier information to obtain an updated group message;

e. querying the home location register or the home subscriber server according to the updated group message about a core network node or a broadcast system node for transmitting the group message; and g. transmitting the updated group message to the core network node or the broadcast system node in the selected transmission mode.

In an embodiment, the method further includes between the steps e and g the step of: f. connecting the interworking function device with a cell broadcast center or a broadcast multicast service center to support transmission of the group message in a broadcast mode.

In an embodiment, the predetermined policy in the step b includes: that if the group message includes pure service data, then the transmission mode is a cell broadcast service mode or a multimedia broadcast multicast service mode, and the step g further comprises the step of: transmitting the pure service data to the broadcast system node.

In an embodiment, the predetermined policy in the step b includes: that if the group message includes pure service data, then the transmission mode is a cell broadcast service mode or a multimedia broadcast multicast service mode, and the step g further comprises the step of: transmitting the pure service data to the broadcast system node.

In an embodiment, the broadcast multicast service center determines the geographical area as its own service area, and the cell broadcast center determines the internal group identifier as a message identifier of a cell broadcast service, or the broadcast multicast service center determines the internal group identifier as a service identifier of a multimedia broadcast multicast service.

In an embodiment, the predetermined policy in the step b includes: that if the group message includes a group based trigger request message without application layer data, then the transmission mode is a group paging mode, and the step g further comprises the step of: transmitting the group based trigger request message without the application layer data to the core network node.

In an embodiment, the predetermined policy in the step b includes: that if the group message includes a group based trigger request message with application layer data and the transmission mode is a group paging plus SMS mode, then the step g further includes the step of: transmitting the group based trigger request message without the application layer data and a SMS indicator message generated by the interworking function device to the core network node; and transmitting the SMS carrying the application layer data to a machine type communication group corresponding to the internal group identifier through a SMS system network node and a mobile communication network node. Particularly, optionally the mobile communication network node retains the SMS until the core network node transmits a deleting indicator about the machine type communication group to the mobile communication network node.

In an embodiment, the trigger request message instructs a core network device to initiate a group paging procedure in the indicated geographical area according to the updated group message received from the interworking function device of machine type communication, a paging message in the paging procedure carrying the internal group identifier.

In an embodiment, the updated group message further includes trigger application indicator information.

In an embodiment, the updated group message further includes dispersion parameter information generated by the interworking function device for discretizing a response time of a machine type communication device of a target group.

A second aspect of the invention proposes a method, in a user equipment for machine type communication, of assisting in distributing a group message of machine type communication, the method including the steps of:
  o. receiving a message from a network; and
  p. analyzing the message and hereby instructing the user equipment to respond, wherein the step p includes one of:
    if the message is a group paging message and the user equipment supports only a group paging scheme, then instructing the user equipment to initiate a report to the network;
    if the message is a group paging message and the user equipment supports a group paging plus SMS scheme, then instructing the user equipment to initiate a service request or an extended service request for receiving a SMS transmitted to a group where the user equipment resides, and to respond according to an indication of the SMS, wherein the service request or the extended service request includes an equipment identifier and a group identifier; or
    if the user equipment supports a cell broadcast service or a multimedia broadcast multicast service, then receiving a group message transmitted to the group where the user equipment resides according to configuration information pre-stored in the user equipment and responding according to an indicator of the group message.

In an embodiment, the message includes dispersion parameter information, and the user equipment discretizes a time that the user equipment is accessed to the network using the dispersion parameter information or the equipment identifier and/or MAC address of the user equipment.

In an embodiment, the dispersion parameter information is generated by an access network node.

Moreover, a third aspect of the invention proposes an interworking function apparatus for distributing a group message of machine type communication, the apparatus performing the method according to any one of claims 1 to 11 in distributing the group message of machine type communication.

The methods and apparatuses according to the invention address various problems of existing machine type communication, enable transmission of a group message in group paging, group paging plus SMS, broadcast and other schemes, are more efficient and address the problems in the previous CBS based process of distributing a group message. The method can be applicable to different 3GPP system.

BRIEF DESCRIPTION OF DRAWINGS

Other features, objects and advantages of the invention will become more apparent from the following detailed description of non-limiting embodiments with reference to the drawings, in which.

Identical or similar reference numerals denote identical or similar devices (modules) or steps throughout different figures in the drawings.

DETAILED DESCRIPTION OF EMBODIMENTS

Functions of different network elements that are involved will be enhanced to support the invention proposed by the invention. Firstly respective network elements illustrated in FIG. 1 will be introduced briefly for the sake of a convenient description. Functions of the different network elements will be described below.

Figure 2:
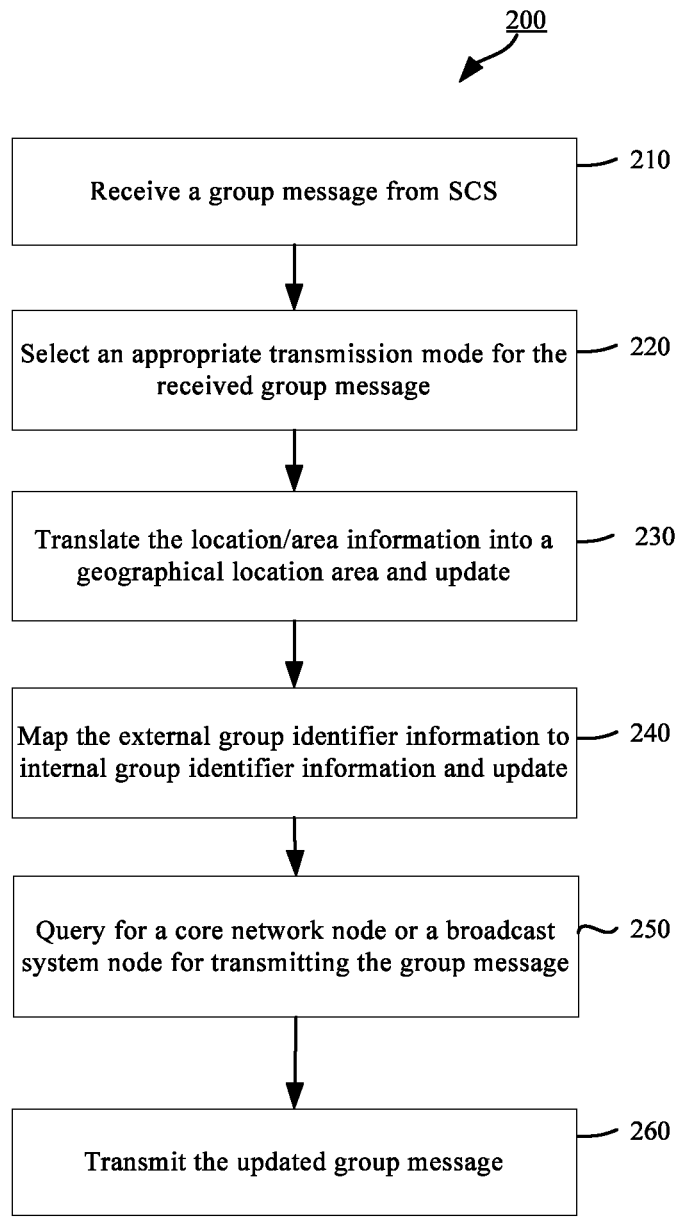
FIG. 2 illustrates a flow chart of the method according to the invention.

Machine Type Communication InterWorking Function (MTC-IWF)
  a) A group message is received from a Service Capability Server (SCS), where the group message includes location/area information, radio access technology information, external group identifier information and/or application layer data;
  b) An appropriate transmission mode is selected for the received group message;
  c) The location/area information from the SCS is translated into a geographical area, in which the group message is distributed, in a network configured mapping relationship; and the group message is updated with the geographical area;
  d) A proper Home Location Register/Home Subscriber Server (HLR/HSS) is queried, and the external group identifier received from the SCS is mapped to an internal group identifier used in a 3GPP network; and the group message is updated with the internal group identifier information to obtain an updated group message;
  e) The proper home location register/home subscriber server is queried to select an appropriate core network node, i.e., a Serving GPRS Support Node (SGSN) or a Mobility Management Entity (MME), or a broadcast system node, i.e., a CBC or a BM-SC, to transmit the group message. Whether to perform this task, the task above of selecting an appropriate transmission mode and the task above of mapping the group identifier in separate signaling is decided by a design of signaling and go beyond the scope of the invention, and thus a redundant description thereof will be omitted here;

f) A connection is made with the CBC or the BM-SC to support transmission of the group message in a broadcast mode, see FIG. 2 for structural details of the connection;

g) The updated group message is transmitted to the selected core network node or the broadcast system node in the selected transmission mode:
   i. When a "group paging" scheme is selected as a transmission mode of a trigger message, a group based trigger message without application layer data is transmitted to the appropriate core network node (the SGSN or the MME);
   ii. When a "group paging plus SMS" scheme is selected as a transmission mode of a trigger message, a group based trigger message without application layer data is transmitted to the appropriate core network node (the SGSN or the MME) by carrying a "SMS Indicator"; and the application layer data of the trigger message is carried in a SMS, and the SMS is transmitted to an MTC group represented by the internal group identifier;
   iii. When a "CBS" scheme is selected as a transmission mode of the group message, a trigger message carrying the application layer data is transmitted or MTC service data, the radio access technology information, the internal group identifier and/or the geographical area is transmitted to the CBC; and
   iv. When an "MBMS" scheme is selected as a transmission mode of the group message, a trigger message carrying the application layer data or MTC service data, the radio access technology information, the internal group identifier and/or the geographical area is transmitted to the BMS; and h) If the updated group message includes a group based trigger request message, then trigger application indicator information is included in the updated group message and transmitted to the 3GPP network together with the included internal group identifier, geographical area information and/or radio access technology information and trigger request message.

Core Network Node (SGSN/MME)
a) A group paging procedure is initiated in the indicated geographical area according to the updated group message received from the machine type communication interworking function. A paging message carries the internal group identifier instead of an equipment identifier;
b) The appropriate MSC is requested for a SMS to be transmitted to the MTC group according to the request of the MTC device; and
c) An instruction carrying the internal group identifier is transmitted to the MSC/VLR to possibly delete the SMS.

Mobile Switching Center/Visited Location Register (MSC/VLR)
The SMS transmitted to the specific MTC group is stored and can not be deleted until the instruction is received from the MME.

Broadcast Multicast Service Center (BM-SC)
a) The geographical area information is received from the machine type communication interworking function and determined as a service area of an (e)MBMS;
b) The internal group identifier is received from the machine type communication interworking function and determined as a service identifier TMGI of the (e)MBMS; and
c) The transmitted updated group message is distinguished between "Trigger Application" or "Pure Service Data". That is, an indicator of "Trigger Application" is included in control plane signaling.

Cell Broadcast Center (CBC)
a) The internal group identifier is received from the machine type communication interworking function and determined as a message ID of the CBS; and
b) The transmitted updated group message is distinguished between "Trigger Application" or "Pure Service Data".

Enhanced Node B/Radio Network Controller/Base Station Controller
a) In order to avoid a large number of MTC devices from initiating responses to a received trigger message concurrently, the radio access network can optionally include a dispersion parameter in RRC signaling perform a process of discretizing transmission times of the response message of the MTC devices. This method relates to network controlled randomization. It shall be noted that the devices can alternatively perform randomization locally, which means that a randomization algorithm is configured or performed locally at the devices; and
b) If an indicator of "Trigger Application" from the core network node is received, then the indicator is distributed in the radio access network.

User Equipment (UE)
a) If a "Group Paging" scheme is supported, then an immediate or early report is initiated to the network based on the received group paging message even if it is not a configured periodical transmission time. How to transmit such a report is beyond the scope of the present invention.
b) If a "Group Paging plus SMS" is supported, then:
   i) According to the received group paging message, an "extended" service request is initiated to receive SMS transmitted to the current group, and a message transmitted to the network also carries the equipment identifier and the group identifier; and
   ii) A corresponding responsive action is made according to the application layer data in the received SMS, for example, application layer data is generated, and a connection setup request is initiated to the SCS/AS if necessary.
c) If a "CBS" or "MBMS" scheme is supported, then:
   i) The ID of a CBS message to be searched or received by the MTC device is configured offline and stored in an SIM/USIM card. The identifier TMGI of an MBMS service of interest to the MTC device is configured offline and stored in the SIM/USIM card. With the information of the internal group identifier, the MTC device can know which group messages are transmitted thereto;
   ii) A group based feature is supported, and a capability is provided to separate a group message from a CBS message and an MBMS bearer;
   iii) A corresponding responsive action is made according to the received application layer data, for example, application layer data is generated, and a connection setup request is initiated to the SCS/AS if necessary; and iv) If the content of the received group message is pure service data, then the received group message is received and stored; and d) A transmission time to transmit a trigger response message is randomized according to the received dispersion parameter or local method:

i) The indicator of the dispersion parameter received from the network is followed under the control of the network; and ii) For the local method, the equipment identifier or MAC address of the device can be used to offset a time that the device is accessed to the network.

For a network consisted of the above mentioned functionally enhanced network elements, the invention proposes a method 200, in an interworking function device, of distributing a group message of machine type communication, and as illustrated in FIG. 2, the method includes the steps of: receiving the group message from a service capability server, where the group message includes location/area information, radio access technology information, external group identifier information and/or application layer data 210; b. selecting an appropriate transmission mode for the received group message, that is, selecting a transmission mode under a predetermined policy according to the group message or obtaining the transmission mode by querying a home location register or a home subscriber server according to the group message; translating the location/area information into a geographical area in which the group message is transmitted and updating the group message with the geographical area 230; mapping the external group identifier information to internal group identifier information according to information in the home location register or the home subscriber server and updating the group message with the internal group identifier information to obtain an updated group message 240; querying the home location register or the home subscriber server according to the group message about a core network node or a broadcast system node for transmitting the group message 250; and transmitting the updated group message to the core network node or the broadcast system node in the selected transmission mode 260. Optionally the method can further include between the steps 250 and 260 the step 255 of: connecting the interworking function device with a cell broadcast center or a broadcast multicast service center to support transmission of the group message in a broadcast mode.

In order to accommodate demands of different machine type communication services, setting of the predetermined policy here is of particular important, and an operating flow of the method will be described below in connection with particular application scenarios.

Figure 3:
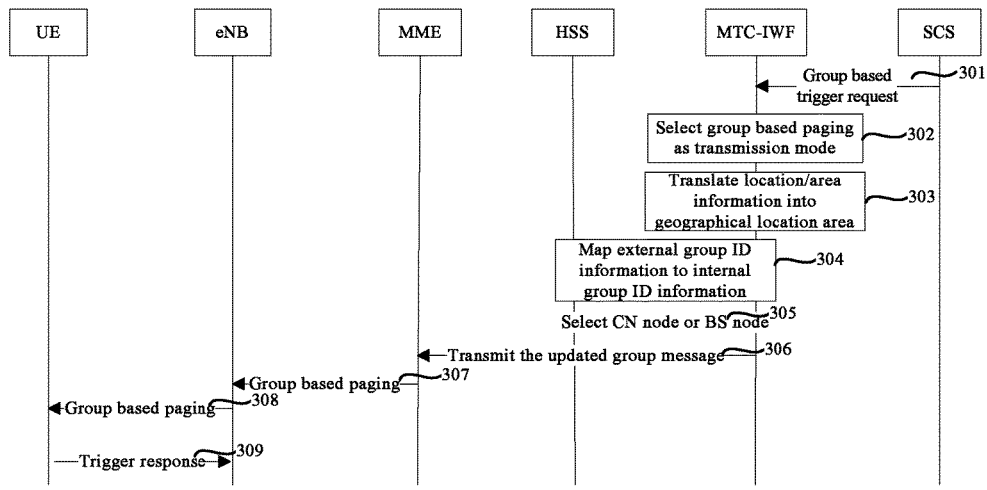
FIG. 3 illustrating an operating flow chart of an embodiment of the invention.

FIG. 3 illustrates an application scenario of the solution for a group based trigger request message without application layer data. For example, in some typical MTC applications, both the capability and the behavior of an MTC device are simpler than a normal UE, and moreover, all the data transmitted from such an MTC device to a network is data of a unique invariable type. For example, a smart measurement device reports only its measured data to the network, and an automatic vending machine reports its inventory information to the network. In addition to a periodical report of data to the network from the MTC device on its own initiative, there is such another demand that an MTC server obtains data from the MTC device (e.g., in a trigger request message). At this time the network initiates a group based trigger message to the MTC device without carrying application layer data to inform the device of how to act. A group based trigger message will be referred below to as simply as a trigger message for the sake of conciseness.

For such an MTC application scenario, a paging based solution is the most straightforward solution. However, when a plurality of MTC devices needs to be triggered concurrently, the existing paging mechanism can not be reused directly because it can not work effectively. In view of this, the use of a group based paging solution is proposed to perform the task of triggering a plurality of MTC devices. At this time a paging message carries a group identifier of a target MTC group. This solution will be referred below to as "group paging".

In this application scenario, a trigger request is distributed in a manner of signaling in a Long Term Evolution (LTE) system. A flow chart of distributing a group message is as illustrated in FIG. 3. In this application scenario, a machine type communication interworking function makes use of different signaling to perform tasks of selecting a transmission mode, mapping a group identifier and querying for routing of a core network node. The operating flow chart will be introduced below step by step with reference to the reference numerals:

Firstly, in the step 301, a trusted SCS transmits a group based trigger message to a machine type communication interworking function by carrying a group identifier of an indicated group and location/area information;

Next, in the step 302, the machine type communication interworking function selects "paging grouping" as a transmission mode;

Then, in the step 303, the machine type communication interworking function translates the location/area information into a geographical area in which the group message is distributed and updates the group message with the geographical area;

Next, in the step 304, the machine type communication interworking function queries a proper home location register/home subscriber server, maps the external group identifier received from the SCS to an internal group identifier used in a 3GPP network and updates the group message with the internal group identifier to obtain an updated group message to be transmitted;

Then, in the step 305, the machine type communication interworking function queries the proper home location register/home subscriber server to select an appropriate core network node MME to transmit the group message;

Next, in the step 306, the machine type communication interworking function transmits the updated group message to the selected MME by carrying a request type "Trigger Application" and additionally the internal group identifier of an MTC group and the geographical area information; and optionally the updated group message includes a dispersion parameter;

Next, in the steps 307 and 308, the selected MME initiates a group paging procedure in the indicated geographical area. A paging message carries the internal group identifier instead of an equipment identifier, and optionally, a group paging message of a radio access network includes the dispersion parameter; and Finally in the step 309, the MTC device initiates an immediate or early report to the network after the group paging message is received, and transmits a trigger response message according to an indicator of the received dispersion parameter or under the control of the local method. How to transmit a trigger response message is beyond the scope of the invention. This way the MTC type of communication has been accomplished. This solution of group paging is more efficient and addresses the problems that can not be solved by the traditional paging.

However, not all the machine types of communication relate to such a trigger request process, for example, an application scenario for another machine type of communication, i.e., a group based trigger request message carrying application layer data. In contrast, in this scenario, a group based trigger request message can be used to trigger an MTC device in an MTC group to transmit different types of application data to the network, that is, trigger different actions of the MTC device. Thus, a trigger request message transmitted from the SCS shall carry a request type and application layer data. How to distribute a trigger request message carrying application layer data is an issue desirable to be addressed.

Figure 4:
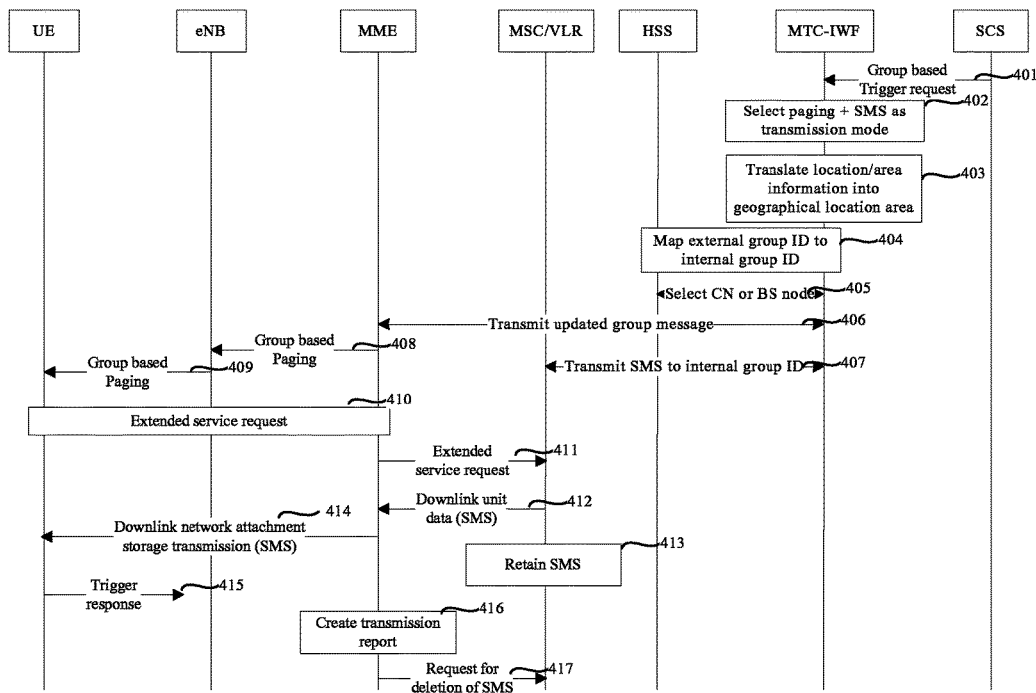
FIG. 4 illustrating an operating flow chart of another embodiment of the invention.

As illustrated in FIG. 4, there is group based paging plus auxiliary SMS. In this solution, group based paging is used to notify a member in an MTC group located in a specific geographical area of arrival of a trigger message. SMS is used to transmit application layer data carried in a trigger request message. Assumed here there are different types of MTC devices applicable to these two application scenarios, where each type of MTC device supports only one of them. Thus the devices themselves can ascertain whether there is a SMS to be further received following a group based paging message they receive. This solution will be referred below as to "group paging plus SMS" for the sake of conciseness.

In an embodiment of this application scenario, a trigger request is signaled for distribution in a Long Term Evolution (LTE) system. A flow of distributing a group message is as illustrated in FIG. 4. In this instance, a machine type communication interworking function makes use of different signaling to perform tasks of selecting a transmission mode, mapping a group identifier and querying for routing of a core network node. A particular operating flow is as follows:

Firstly in the step 401, a trusted SCS transmits a group based trigger message to a machine type communication interworking function by carrying a group identifier of an indicated group and location/area information;

Next in the step 402, the machine type communication interworking function selects "paging grouping plus SMS" as a transmission mode;

Then in the step 403, the machine type communication interworking function translates the location/area information into a geographical area in which the group message is distributed and updates the group message with the geographical area;

Next in the step S404, the machine type communication interworking function queries a proper home location register/home subscriber server, maps the external group identifier received from the SCS to an internal group identifier for use in a 3GPP network and updates the group message with the internal group identifier to obtain an updated group message; and although an HSS (Home Subscriber Server) is illustrated in the figure, the HSS can be replaced by an HLR (Home Location Register) in some application scenarios;

Then, in the step 405, the machine type communication interworking function queries the proper home location register/home subscriber server to select an appropriate core network node MME to transmit the group message;

Next, in the step 406, the machine type communication interworking function transmits the updated group message to the selected MME by carrying a request type "Trigger Application" and additionally a SMS indicator, the internal group identifier of an MTC group and the geographical area information; and optionally the updated group message includes a dispersion parameter;

Next, in the step 407, the machine type communication interworking function carries application layer data of the trigger message in a SMS and transmits the SMS to the MTC group represented by the internal group identifier;

Next, in the steps 408 and 409, the selected MME initiates a group paging procedure in the indicated geographical area. A paging message carries the internal group identifier instead of an equipment identifier, and optionally a group paging message of a radio access network includes the dispersion parameter;

Next, in the step 410, a UE initiates an "extended" service request procedure, according to the received group paging message, for receiving a SMS transmitted to the current group, and a message transmitted to the network also carries the equipment identifier and the group identifier;

Next, in the step 411, the MME forwards the message transmitted from the UE to an appropriate MSC/VLR;

Next, in the step 412, the MSC/VLR transmits the SMS to the UE through the MME, and in the same time, the MSC/VLR retains the SMS of the current group until an instruction from the MME is received;

Next, in the steps 414 and 415, the UE makes a corresponding responsive action according to the application layer data in the received SMS, for example, generates application layer data, and initiates a connection setup request to the SCS/AS if necessary; and here in order to avoid a large number of MTC devices from initiating an "extended" service request procedure concurrently, a network access procedure is randomized according to an indicator of the received dispersion parameter or local method;

Next, in the step 416, the MME transmits an instruction carrying the internal group identifier to the MSC/VLR to possibly delete the SMS when the MME decides to transmit a report (a success or failure reason) to the machine type communication interworking function; and Finally, in the step 417, the MSC/VLR deletes the SMS after the instruction is received.

Figure 1:
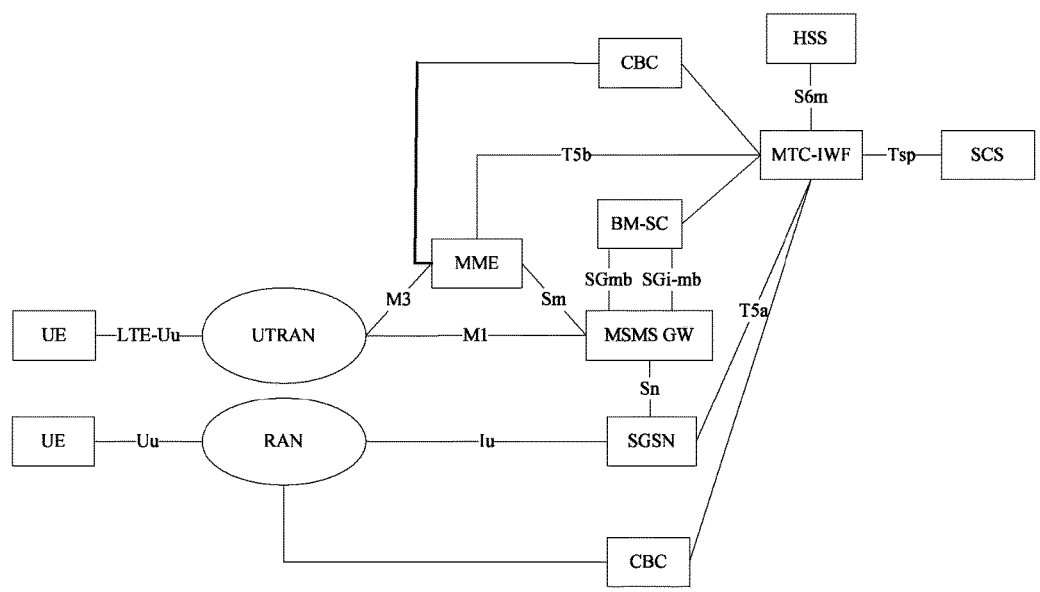
FIG. 1 illustrates a schematic diagram of an interworking function device of machine type communication being connected with a broadcast system node.

Optionally, in another embodiment of this application scenario, a CBS or an (enhanced) Multimedia Broadcast Multicast Service (eMBMS) can also be selected. In this solution, a CBS or an (e)MBMS transmits the same trigger message to all the members in an MTC group located in a specific geographical area. A different physical network element, i.e., a CBC (Cell Broadcast Center) or a BM-SC (Broadcast Multicast Service Center) may provide a different MTC service. A reference architecture is as illustrated in FIG. 1. A CBC (Cell Broadcast Center) is illustrated repeatedly in the figure merely for the sake of a convenient illustration without any other intent. Two broadcast modes in this solution will be referred below to as "CBS" or "MBMS" for the sake of conciseness.

At the MTC device side, an internal group identifier, i.e., the ID of a CBS message to be searched for or received by the device is configured offline and stored in an SIM/USIM card. Similarly the service identifier, TMGI (Temporary Mobile Group Identifier), of an (e)MBMS service of interest to and to be received by the device is also configured offline and stored in the SIM/USIM card. With this information base, the MTC device can know from comparisons which group messages are transmitted thereto In order to avoid a large number of MTC devices from initiating responses to a received trigger message concurrently, optionally a radio access network can include a dispersion parameter in RRC signaling to perform a process of discretizing transmission times of the response message of the MTC devices. This method relates to network controlled randomization.

A trigger request message transmitted to an MTC group may fail to be transmitted to a part of MTC devices in the group. When the trigger request message is not defined as a single transmission attempt, then a machine type communication interworking function may initiate another attempt of the trigger message according to a report received from the 3GPP network. In order to notify the machine type communication interworking function of whether a previously transmitted trigger message has been transmitted successfully or a reason for failing to be received, the network will need a feedback from the MTC device including a transmission status of the trigger message. In view of the foregoing consideration, the invention proposes an indicator to be added to the existing system for notifying the receiving MTC device that a group message being transmitted is "Trigger Application". With this solution, the MTC device can initiate a feedback notifying the network whether it has received the trigger message correctly or of a reason for failing to be received. How to define an action of the device and how to transmit a feedback area is beyond the scope of the invention.

Figure 5:
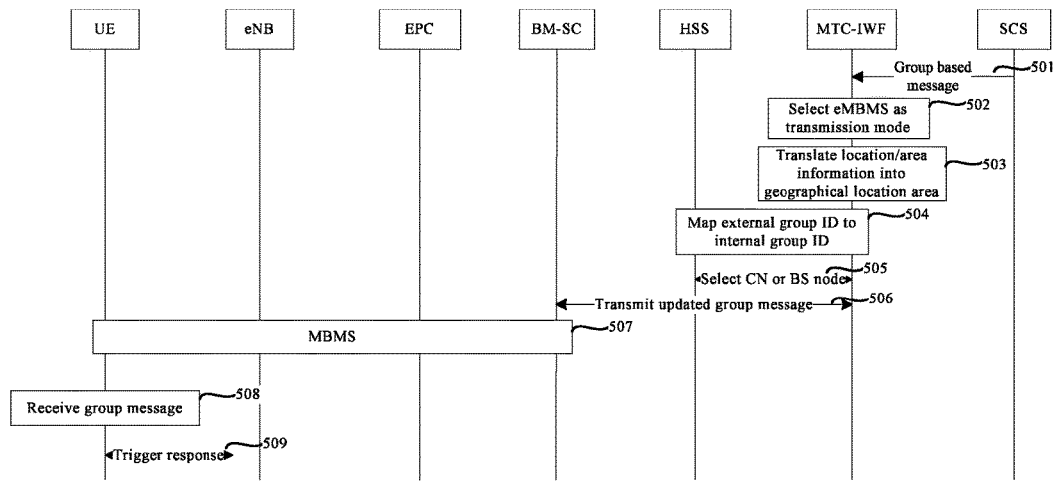
FIG. 5 illustrating an operating flow chart of a further embodiment of the invention.

Specifically referring to FIG. 5, an operating flow of an embodiment of this solution is as follows:

Firstly in the step 501, a trusted SCS transmits a group based trigger message to a machine type communication interworking function by carrying a group identifier of an indicated group and location/area information;

Next in the step 502, the machine type communication interworking function selects a multimedia broadcast multicast service as a transmission mode;

Then in the step 503, the machine type communication interworking function translates the location/area information into a geographical area in which the group message is distributed and updates the group message with the geographical area;

Next in the step S504, the machine type communication interworking function queries a proper home location register/home subscriber server, maps the external group identifier received from the SCS to an internal group identifier for use in a 3GPP network and updates the group message with the internal group identifier to obtain an updated group message;

Then in the step 505, the machine type communication interworking function queries the proper home location register/home subscriber server to select an appropriate core network node or a broadcast system node to transmit the group message;

Next in the step 506, the machine type communication interworking function transmits the updated group message to a BM-SC by carrying a request type "Trigger Application" and additionally the internal group identifier of an MTC group and the geographical area information;

Next, in the steps 507 and 508, the selected BM-SC transmits the group message to the user equipment in a multimedia broadcast multicast service, and optionally a group paging message of a radio access network includes a dispersion parameter; and Finally, in the step 509, the MTC device decides which response to be initiated to the network according to the content of the received group paging message upon reception of the group message.

In addition to the foregoing two types of group messages, there is another type of group message, that is, pure service data transmitted in a push mode. In this application scenario, a user equipment does not need to initiate a response to a network as long as the user equipment only receives the pure data. At this time an MTC server can transmit the pure service data to another MTC device. This application scenario frequently refers to a push service, for example, the MTC server initiates a software update of its MTC device. At this time no response from the MTC device is required. At this time a CBS or an (e)MBMS can transmit the same trigger message to all the members in an MTC group located in a specific geographical area. A different physical network element, i.e., a CBC or a BM-SC, may provide a different MTC service.

Here transmitted application layer contents carry an indicator indicating that the transmitted contents are pure service data. Since this application scenario expects no response from any device, a radio access network does not need to distribute a dispersion parameter in RRC signaling so as to avoid a large number of devices from initiating responses concurrently. When the MTC device detects a CBS or (e)MBMS service, it simply receives application layer data from a CBS message or over an (e)MBMS bearer.

Figure 6:
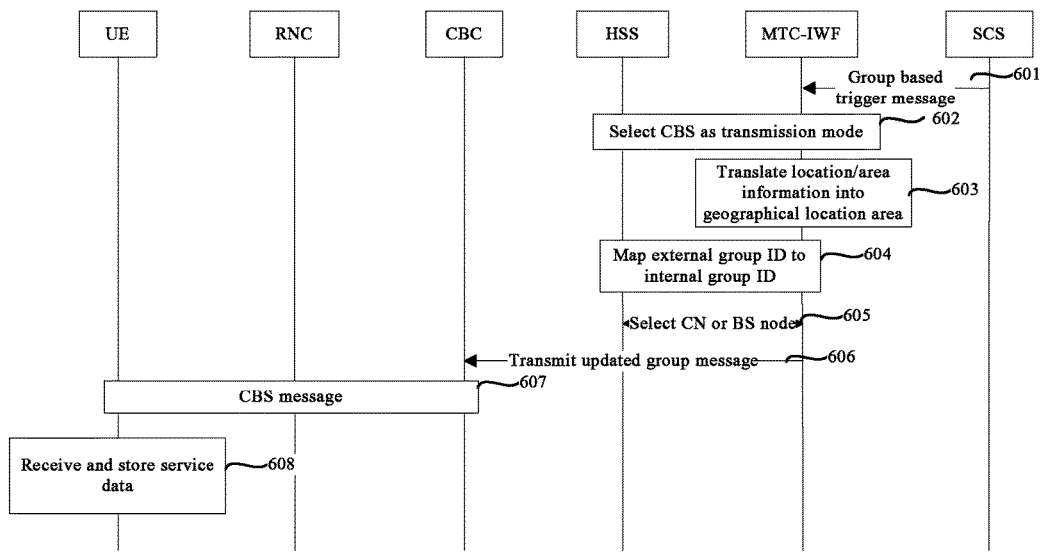
FIG. 6 illustrating an operating flow chart of a further embodiment of the invention.

Specifically in operation, a flow chart of an embodiment in this scenario is as illustrated in FIG. 6, and more specifically:

Firstly, in the step 601, a trusted SCS transmits a group based trigger message to a machine type communication interworking function by carrying a group identifier of an indicated group and location/area information;

Next, in the step 602, the machine type communication interworking function obtains a cell broadcast service as a transmission mode by querying a home location register/home subscriber server;

Then, in the step 603, the machine type communication interworking function translates the location/area information into a geographical area in which the group message is distributed and updates the group message with the geographical area;

Next, in the step S604, the machine type communication interworking function queries the proper home location register/home subscriber server, maps the external group identifier received from the SCS to an internal group identifier for use in a 3GPP network and updates the group message with the internal group identifier to obtain an updated group message;

Then, in the step 605, the machine type communication interworking function queries the proper home location register/home subscriber server to select an appropriate core network node or a broadcast system node to transmit the group message;

Next, in the step 606, the machine type communication interworking function transmits the updated group message to a cell broadcast center by additionally the internal group identifier of an MTC group and the geographical area information;

Next, in the step 607, the selected cell broadcast center transmits the group message to the user equipment in a CBS message, and optionally a group paging message of a radio access network includes a dispersion parameter; and Finally, in the step 608, the MTC device receives and stores locally service data.

The methods and apparatuses according to the invention address various problems of existing machine type communication, enable transmission of a group message in group paging, group paging plus SMS, broadcast and other schemes, are more efficient and address the problems in the previous CBS based process of distributing a group message. The method can be applicable to different 3GPP system.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method, in an interworking function device, of distributing a group message of machine type communication, the method comprising:
    receiving the group message from a service capability server, wherein the group message includes location/area information, radio access technology information, external group identifier information and/or application layer data;
    selecting a transmission mode under a predetermined policy according to the group message or obtaining the transmission mode by querying a home location register or a home subscriber server according to the group message;
    translating the location/area information into a geographical area in which the group message is transmitted and updating the group message with the geographical area;
    mapping the external group identifier information to internal group identifier information according to information in the home location register or the home subscriber server and updating the group message with the internal group identifier information to obtain an updated group message;
    querying the home location register or the home subscriber server according to the updated group message about a core network node or a broadcast system node for transmitting the group message; and
    transmitting the updated group message to the core network node or the broadcast system node in the selected transmission mode;
    wherein the predetermined policy in the selecting includes:
        if the group message includes pure service data, then the transmission mode is a push mode using a cell broadcast service mode or a multimedia broadcast multicast service mode, and the transmitting further comprises:
            transmitting the pure service data in push mode to the broadcast system node or core network node with an indication that the transmission comprises pure service data; and
        wherein transmission of the pure service data from the broadcast system node or the core network node is devoid of a dispersion parameter in order to prevent receiving devices from initiating multiple responses concurrently.

2. The method according to claim 1, wherein the method further comprises between the querying and transmitting:
    connecting the interworking function device with a cell broadcast center or a broadcast multicast service center to support transmission of the group message in a broadcast mode.

3. The method according to claim 2, wherein the predetermined policy in the selecting includes:
    that if the group message includes a group based trigger request message with application layer data and the transmission mode is a cell broadcast service mode or a multimedia broadcast multicast service mode, then the transmitting further comprises:
    transmitting the group based trigger request message with the application layer data to the broadcast system node.

4. The method according to claim 3, wherein the broadcast multicast service center determines the geographical area as its own service area, and the cell broadcast center determines the internal group identifier as a message identifier of a cell broadcast service, or the broadcast multicast service center determines the internal group identifier as a service identifier of a multimedia broadcast multicast service.

5. The method according to claim 1, wherein the predetermined policy in the selecting includes:
    that if the group message includes a group based trigger request message without application layer data, then the transmission mode is a group paging mode, and the transmitting further comprises:
    transmitting the group based trigger request message without the application layer data to the core network node.

6. The method according to claim 1, wherein the predetermined policy in the selecting includes:
    that if the group message includes a group based trigger request message with application layer data and the transmission mode is a group paging plus SMS mode, then the transmitting further comprises:
    transmitting the trigger request message without the application layer data and a SMS indicator message generated by the interworking function device to the core network node; and
    transmitting a SMS carrying the application layer data to a machine type communication group corresponding to the internal group identifier through a network node and a mobile communication network node of a SMS system.

7. The method according to claim 6, wherein the mobile communication network node retains the SMS until the core network node transmits an deleting indicator about the machine type communication group to the mobile communication network node.

8. The method according to claim 5, wherein the trigger request message instructs a core network device to initiate a group paging procedure in the indicated geographical area according to the updated group message received from the interworking function device of machine type communication, a paging message in the paging procedure carrying the internal group identifier.

9. The method according to claim 3, wherein the updated group message further includes trigger application indicator information.

10. The method according to claim 3, wherein the updated group message further includes dispersion parameter information generated by the interworking function device for discretizing a response time of a machine type communication device of a target group.

11. The method according to claim 1 further comprising, in a user equipment for machine type communication, assisting in distributing a group message of machine type communication by:
  receiving a message from a network; and
  analyzing the message and hereby instructing the user equipment to respond, wherein the analyzing comprises one of:
  if the message is a group paging message and the user equipment supports only a group paging scheme, then instructing the user equipment to initiate a report to the network;
  if the message is a group paging message and the user equipment supports a group paging plus SMS scheme, then instructing the user equipment to initiate a service request or an extended service request for receiving a SMS transmitted to a group where the user equipment resides, and to respond according to an indication of the SMS, wherein the service request or the extended service request includes an equipment identifier and a group identifier; or
  if the user equipment supports a cell broadcast service or a multimedia broadcast multicast service, then receiving a group message transmitted to the group where the user equipment resides according to configuration information pre-stored in the user equipment and responding according to an indicator of the group message.

12. The method according to claim 11, wherein the message includes dispersion parameter information, and the user equipment discretizes a time that the user equipment is accessed to the network using the dispersion parameter information or the equipment identifier and/or MAC address of the user equipment.

13. The method according to claim 12, wherein the dispersion parameter information is generated by an access network node.

14. An interworking function apparatus for distributing a group message of machine type communication, the apparatus performing the method according to claim 1 in distributing the group message of machine type communication.

* * * * *